(12) United States Patent
Long et al.

(10) Patent No.: US 11,493,214 B2
(45) Date of Patent: Nov. 8, 2022

(54) TERMINATION BLOCK

(71) Applicant: Rheem Manufacturing Company, Atlanta, GA (US)

(72) Inventors: Robert L. Long, Fort Smith, AR (US); Kenneth D. Frederick, Fort Smith, AR (US); Karl S. Tallakson, Greenwood, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 463 days.

(21) Appl. No.: 16/684,240

(22) Filed: Nov. 14, 2019

(65) Prior Publication Data

US 2020/0149778 A1    May 14, 2020

Related U.S. Application Data

(60) Provisional application No. 62/767,411, filed on Nov. 14, 2018.

(51) Int. Cl.
| | |
|---|---|
| *F24F 1/26* | (2011.01) |
| *F24F 13/32* | (2006.01) |
| *F24F 11/80* | (2018.01) |
| *G05B 19/042* | (2006.01) |
| *F24F 13/20* | (2006.01) |
| *F25B 41/40* | (2021.01) |
| *F24F 110/40* | (2018.01) |

(52) U.S. Cl.
CPC ............... *F24F 1/26* (2013.01); *F24F 11/80* (2018.01); *F24F 13/20* (2013.01); *F24F 13/32* (2013.01); *F25B 41/40* (2021.01); *G05B 19/0428* (2013.01); *F24F 2110/40* (2018.01); *F25B 2600/02* (2013.01); *G05B 2219/2614* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,464,042 | A * | 11/1995 | Haunhorst | F24F 13/0209 137/614.04 |
| 8,887,392 | B1 * | 11/2014 | Xu | F24F 13/22 29/890.035 |
| 2006/0249589 | A1 * | 11/2006 | Karamanos | F24F 11/00 236/49.3 |
| 2015/0159908 | A1 * | 6/2015 | Votaw | F24F 13/1413 29/446 |
| 2015/0323241 | A1 * | 11/2015 | Oakner | F24F 13/222 62/150 |
| 2020/0088417 | A1 * | 3/2020 | Ingram | F24F 1/32 |
| 2020/0088442 | A1 * | 3/2020 | Salunkhe | F24F 13/222 |

* cited by examiner

*Primary Examiner* — Monica E Millner
(74) *Attorney, Agent, or Firm* — Eversheds Sutherland (US) LLP

(57) ABSTRACT

A termination block of an HVAC unit comprises an elongated body that is coupled to the frame of the HVAC unit. The elongated body securely retains a refrigerant pressure gauge port therein and mounts a filter drier thereto such that copper tubing to and/or from the refrigerant filter drier and the refrigerant pressure gauge port is held in position to assist with brazing the copper tubing to other copper tubing and/or components of the HVAC unit.

19 Claims, 12 Drawing Sheets

TERMINATION BLOCK

CROSS-REFERENCE TO RELATED APPLICATIONS

The present application claims priority to U.S. Provisional Patent Application No. 62/767,411 filed Nov. 14, 2018. The full disclosure of the foregoing application is incorporated by reference herein in its entirety and for all purposes.

TECHNICAL FIELD

The present disclosure relates generally to temperature control systems, and more particularly to a termination block in a temperature control system, such as a heating, ventilation, and air-conditioning (HVAC) unit.

BACKGROUND

HVAC units include numerous copper tubes that are coupled to each other to define different refrigerant lines such as a liquid line, a discharge line, and a suction line. Said refrigerant lines are configured to carry a refrigerant therethrough and route the refrigerant to different components of the HVAC unit, such as a compressor, an evaporator, a condenser, a metering device, a filter drier, etc., during the operation of the HVAC unit. The connections made between different copper tubes and the components of the HVAC unit need to be reliable to prevent any refrigerant leaks in the field. Typically, the installation of the copper tubes in the HVAC units, i.e., coupling the copper tubes to each other and/or coupling the copper tubes to the components of the HVAC unit, may be done by brazing because brazing provides strong connections if carried out properly. However, to properly braze the copper tubes to each other or the different components of the HVAC unit, the copper tubes need to be positioned accurately at the joints where they are to be brazed. Conventional HVAC units lack adequate structures to support and position the copper tubes for proper brazing. Conventional HVAC units may also lack adequate support for installation of external pressure gauge ports such that they are not damaged during shipment of the HVAC unit. Conventional HVAC units may also lack adequate shelter from direct sun exposure for an outdoor ambient sensor of the HVAC unit.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a termination block assembly of an HVAC unit. The termination block assembly includes a termination block defined by an elongated body. The elongated body comprises a hole formed therein. The hole is configured to install and securely retain a refrigerant pressure gauge port therein. The elongated body also includes a coupling aperture that is configured to couple the termination block to a frame of the HVAC unit. Further, the termination block assembly includes a mounting bracket that is coupled to the termination block and configured to mount a refrigerant filter drier to the termination block. The termination block is configured to mount the refrigerant filter drier and the refrigerant pressure gauge port thereto such that copper tubing to and/or from the refrigerant filter drier and the refrigerant pressure gauge port is held in position to assist with brazing the copper tubing to other copper tubing and/or components of the HVAC unit.

In another aspect, the present disclosure relates to an HVAC unit that comprises a refrigerant pressure gauge port and a termination block that is coupled to a frame of the HVAC unit. The termination block is configured to securely couple the refrigerant pressure gauge port thereto such that a first set of copper tubing to and/or from the refrigerant pressure gauge port is held in position to assist with brazing the first set of copper tubing to other copper tubing and/or components of the HVAC unit.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawing, wherein.

Figure 1:
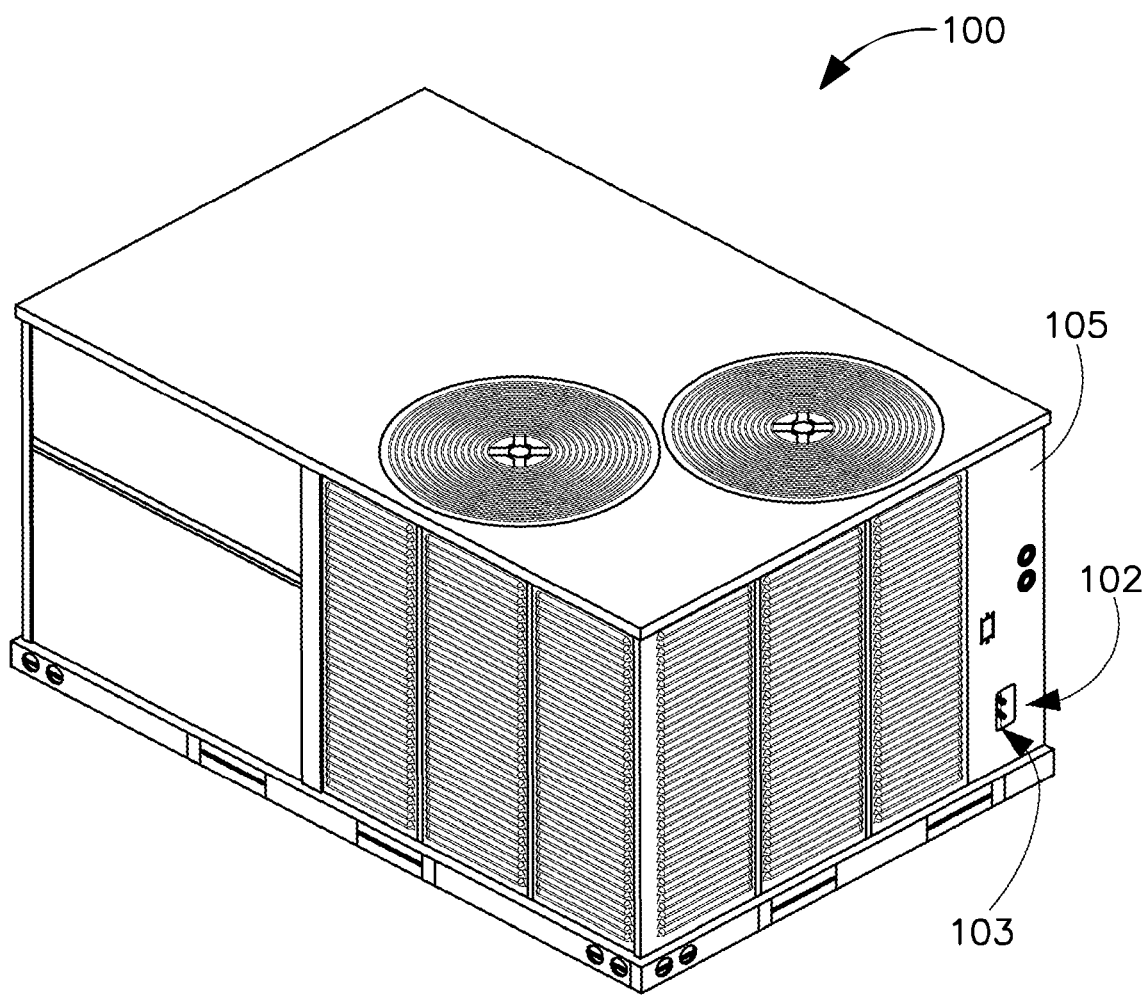
FIG. 1 illustrates a perspective view of an HVAC unit, in accordance with example embodiments of the present disclosure.
Figure 2:
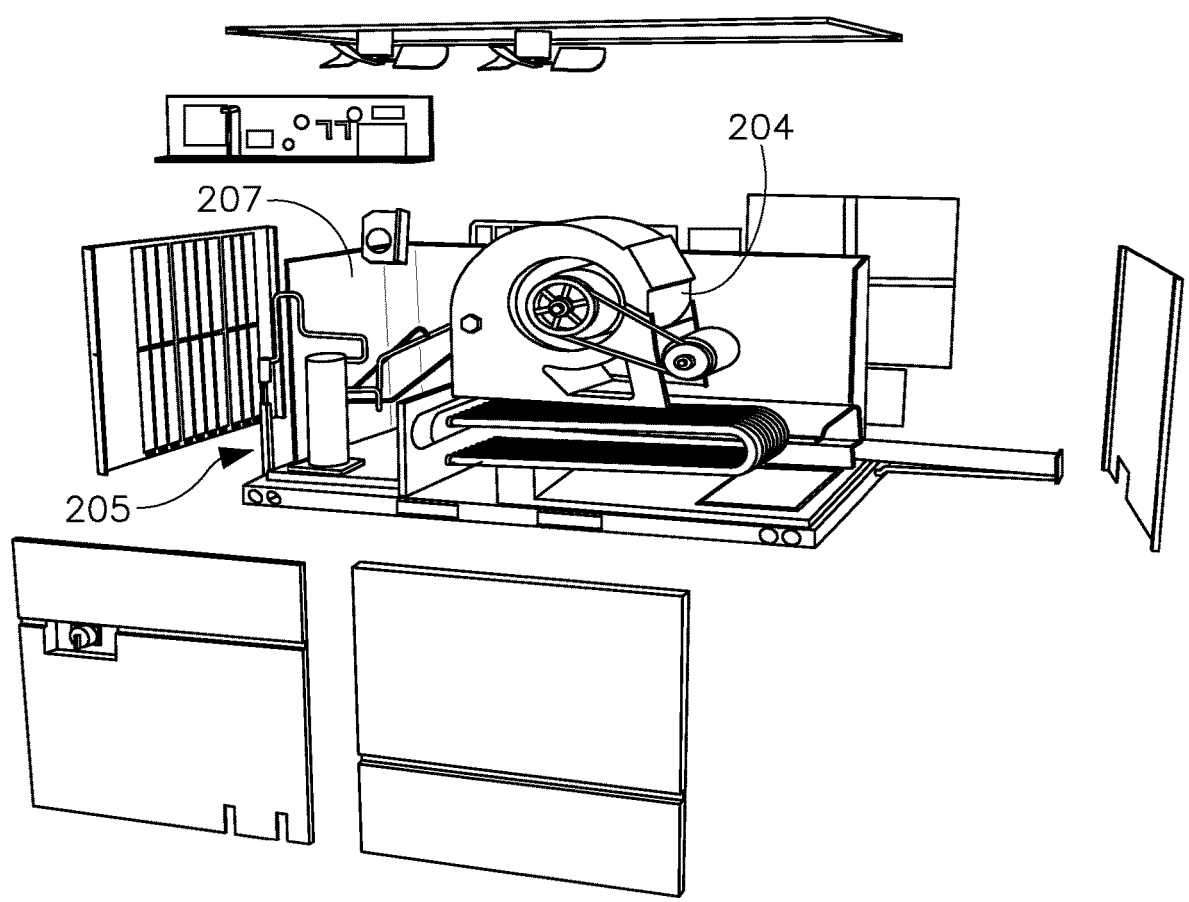
FIG. 2 illustrates an exploded view of a portion of the HVAC unit, in accordance with example embodiments of the present disclosure.
Figure 3:
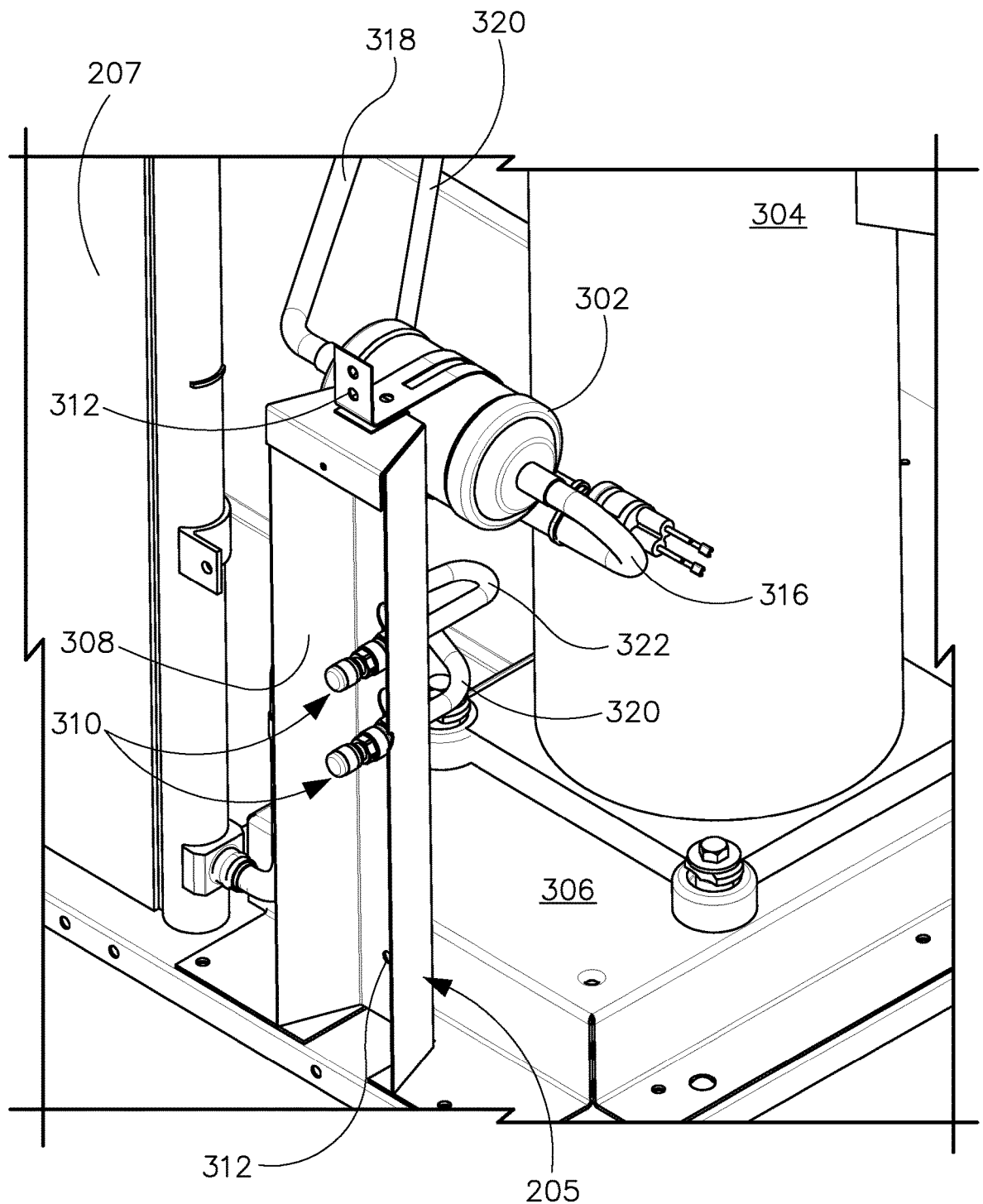
FIGS. 3 and 4 illustrate enlarged views of a portion the HVAC unit of FIG. 1 with the external panels of the HVAC unit removed to expose the termination block, the filter drier, the compressor assembly, and the copper connections associated with said components of the HVAC unit, in accordance with example embodiments of the present disclosure.
Figure 4:
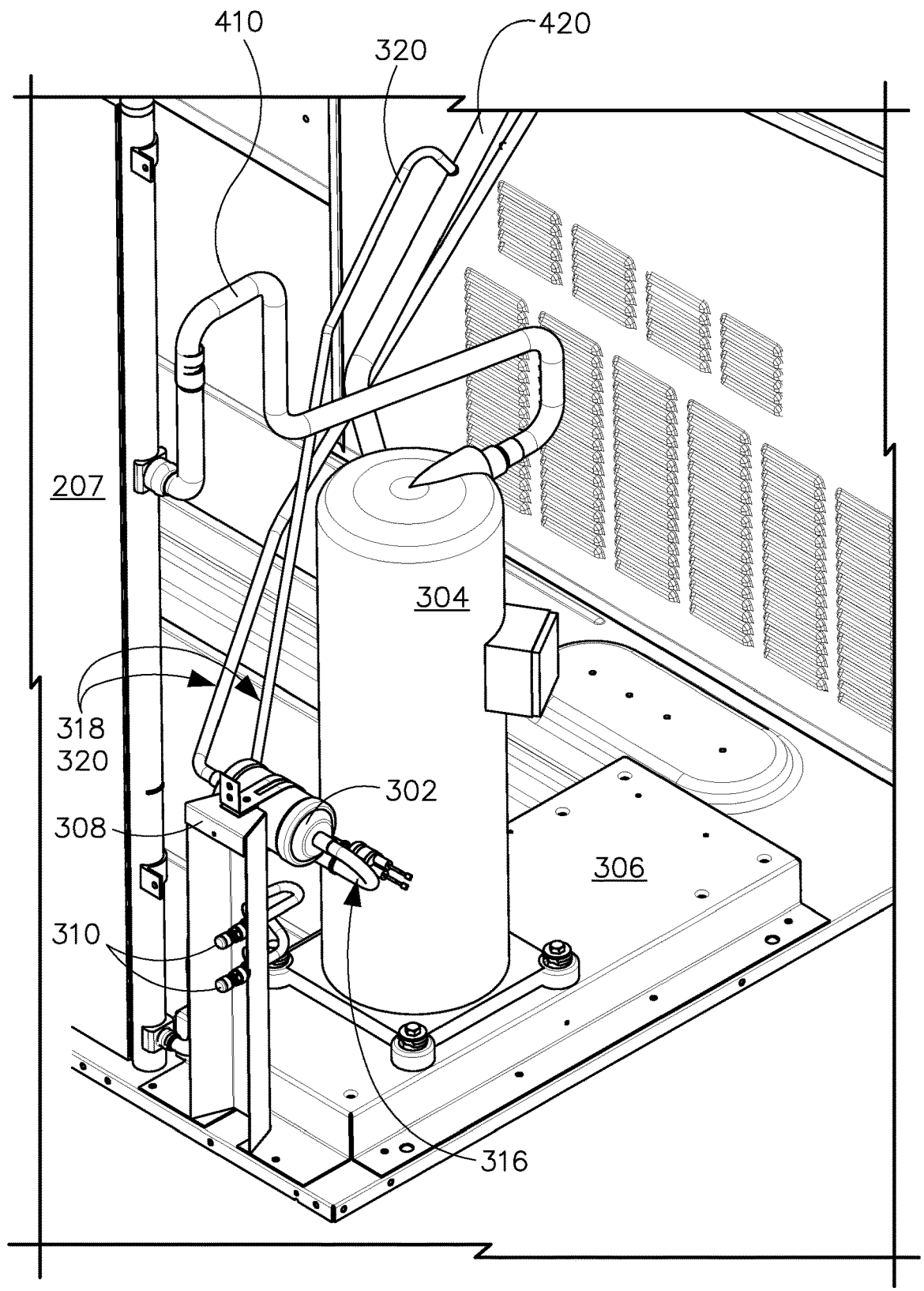
Figure 5:
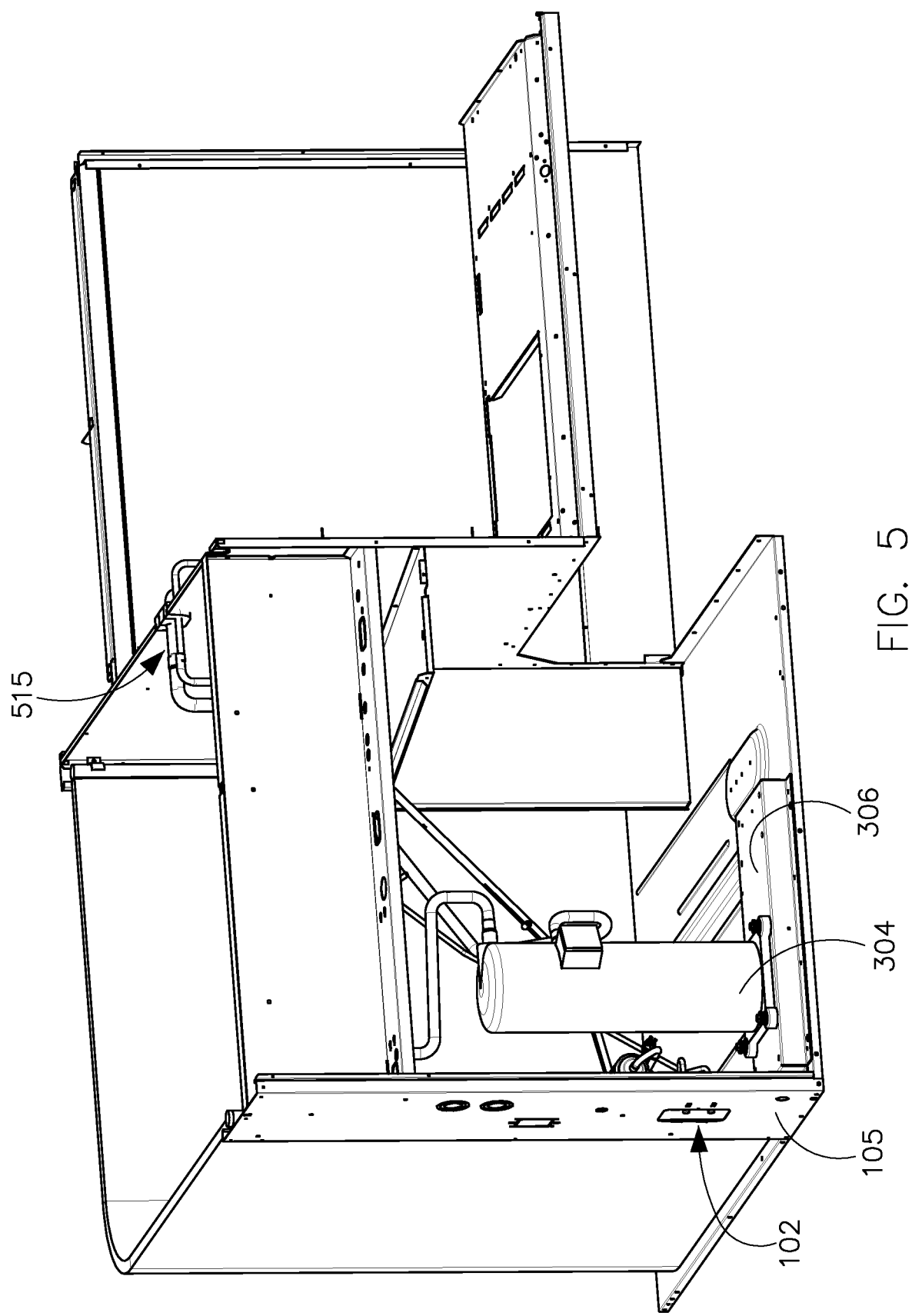
FIGS. 5-11 illustrate different perspective views and enlarged views of at least a portion of the HVAC unit of FIG. 1 with the various external panels of the HVAC unit removed to expose the termination block, different components of the HVAC unit, and the copper connections associated with said different components of the HVAC unit, in accordance with example embodiments of the present disclosure.
Figure 6:
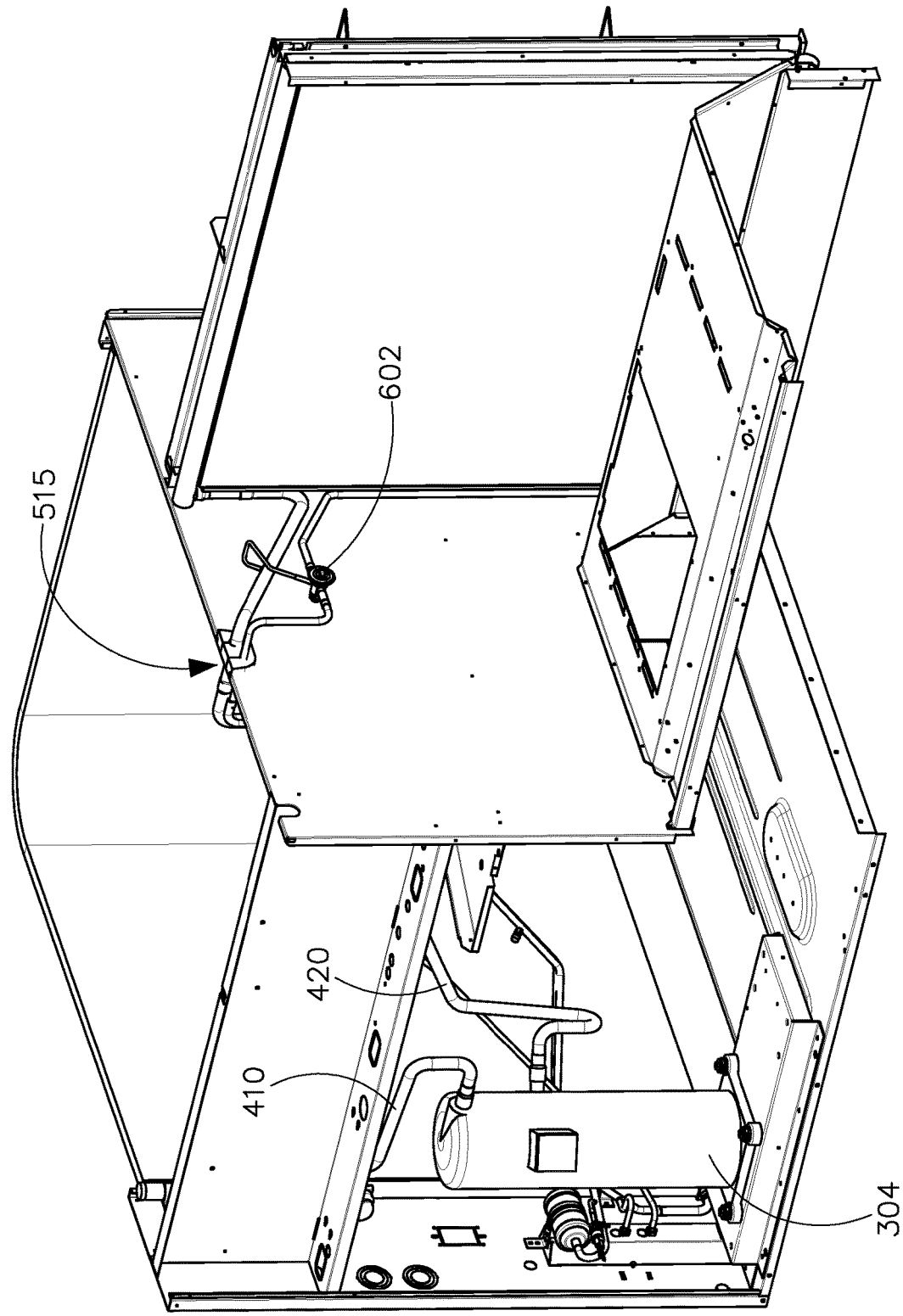
Figure 7:
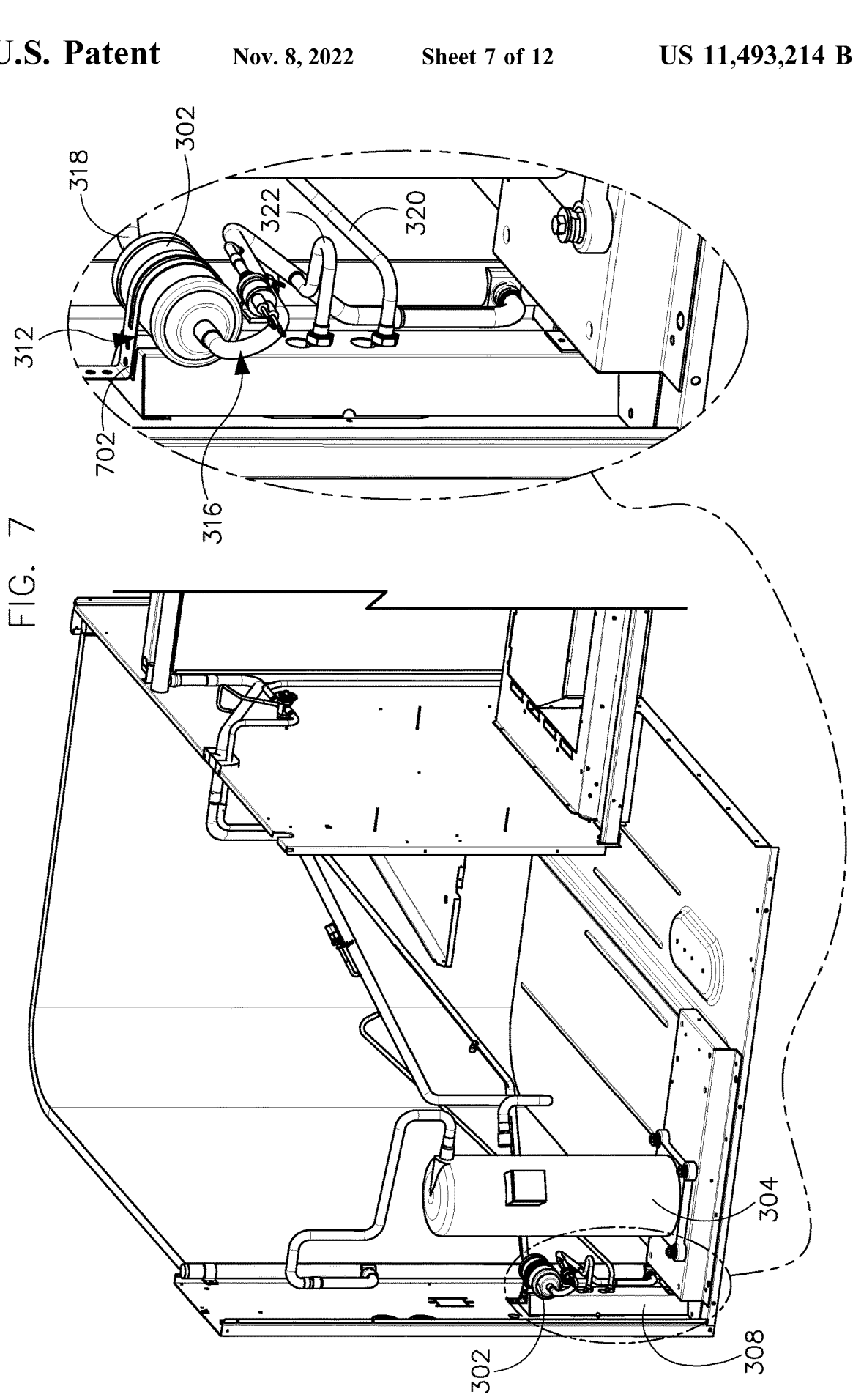
Figure 8:
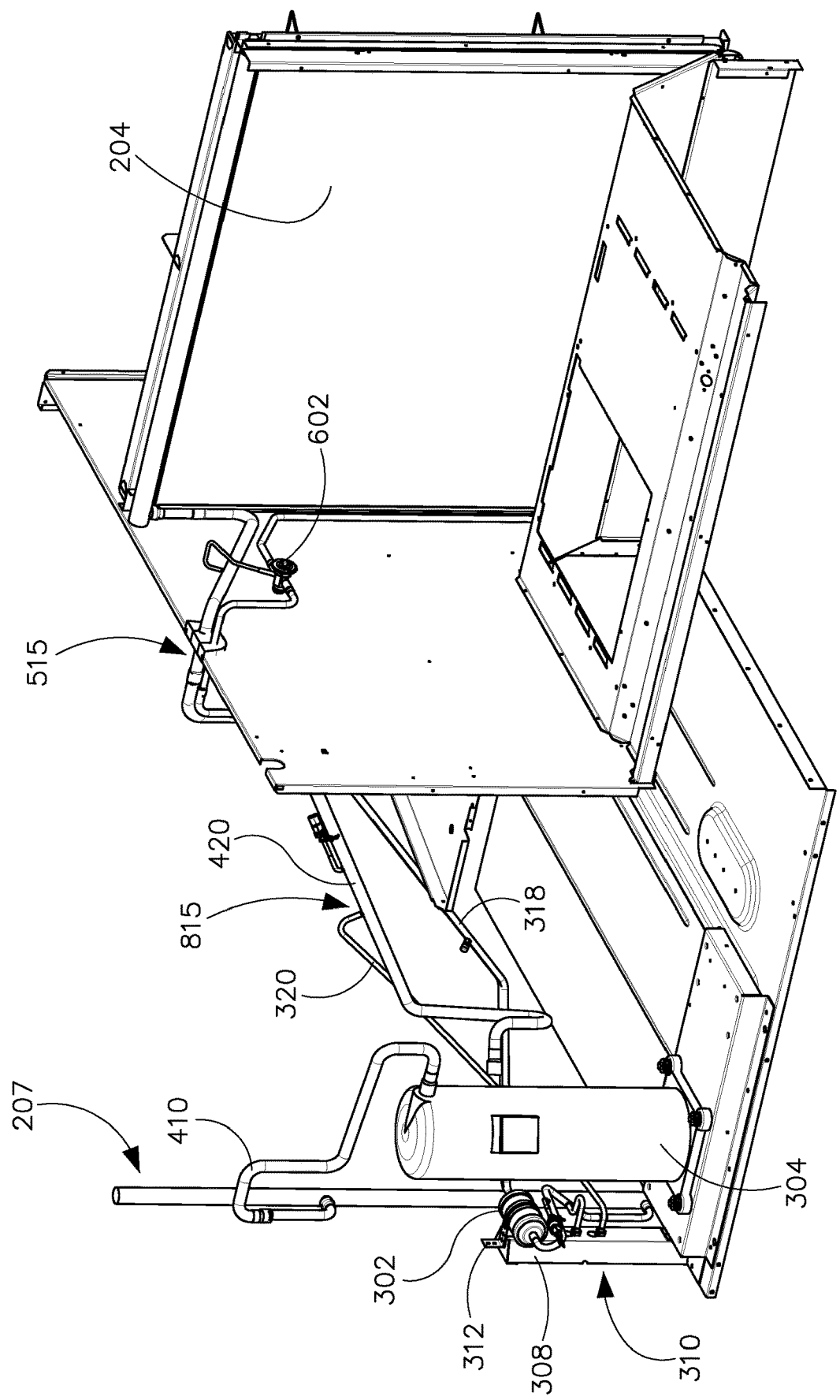
Figure 9:
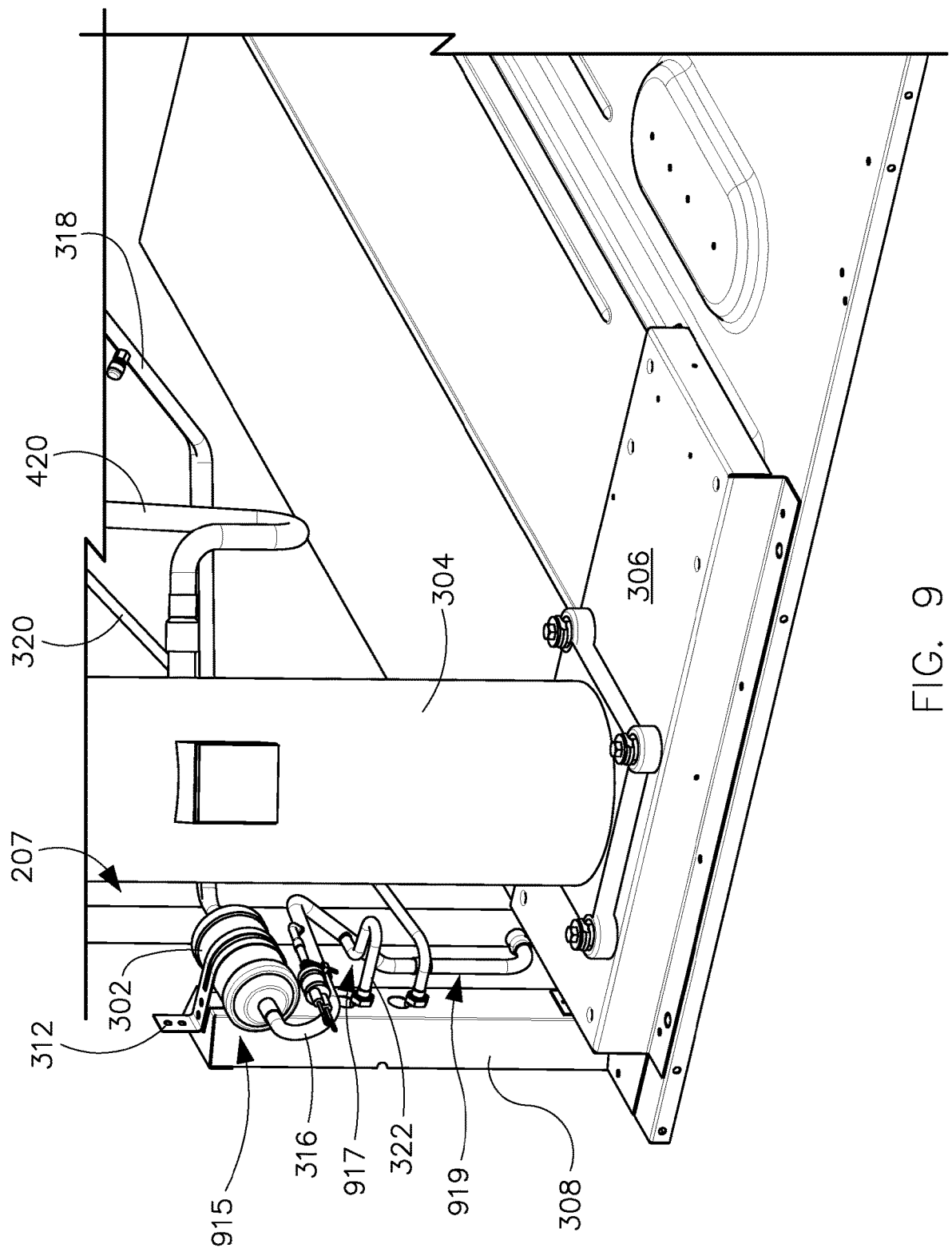
Figure 10:
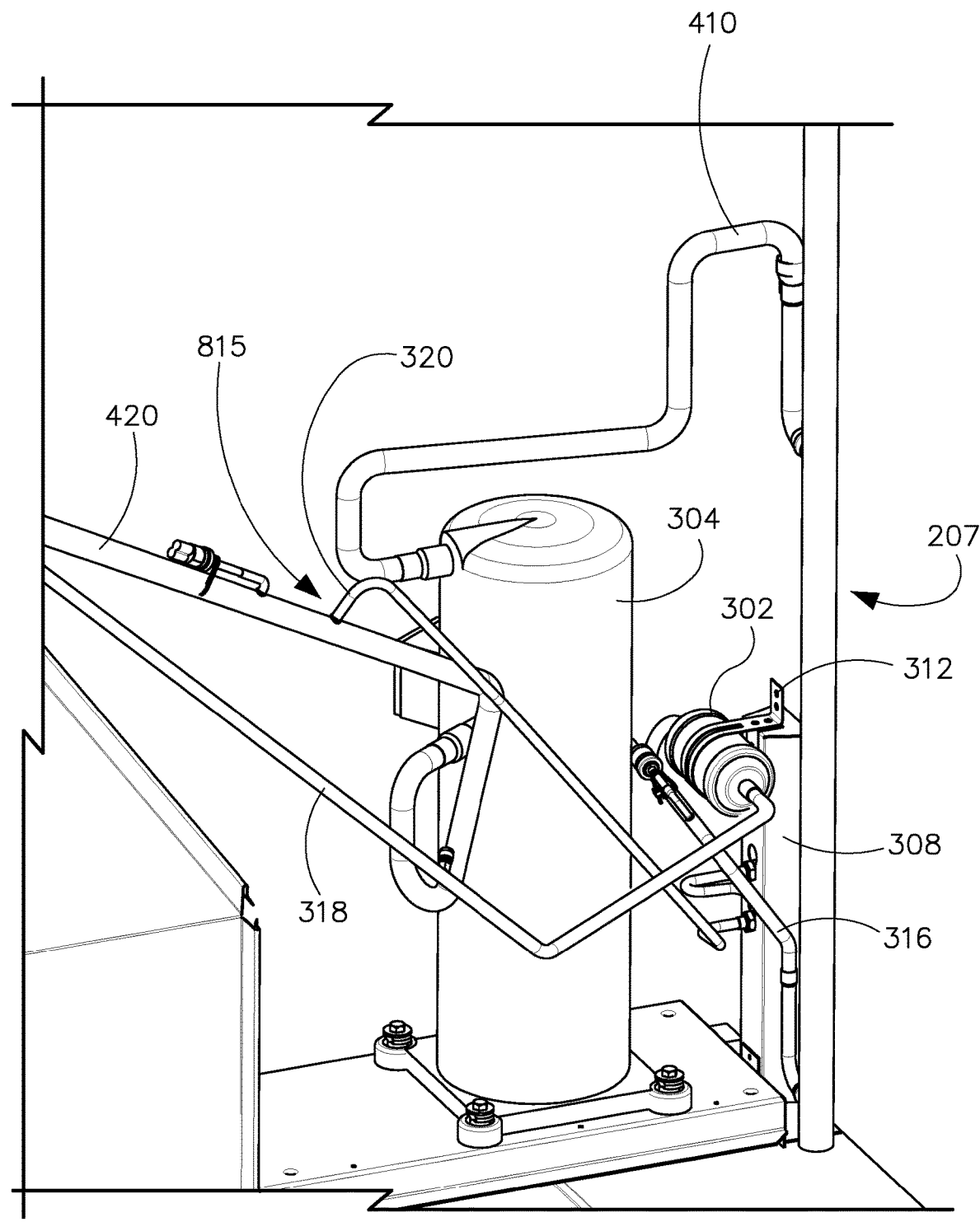
Figure 11:
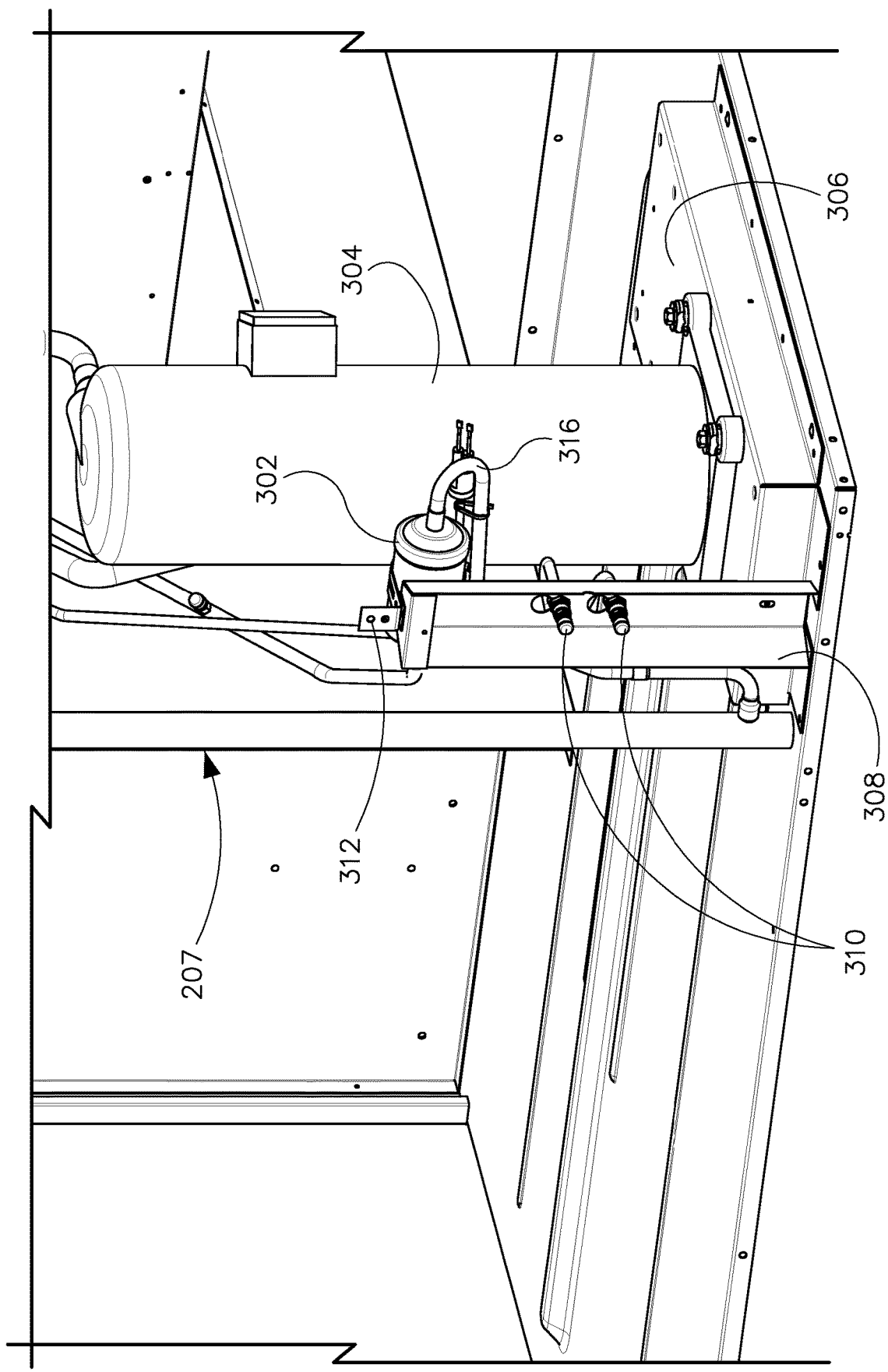

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an example termination block of an HVAC unit. In certain embodiments, the termination block is configured to serve as a mount for a filter drier of the HVAC unit. In certain embodiments, the termination block is also configured to locate and hold positions of copper refrigerant tubes for a final braze process. In certain embodiments, the termination block is configured to provide a termination point for external refrigerant pressure gauges. Further, in certain embodiments, the termination block is configured to provide a sheltered location to place an outdoor ambient air sensor such that the ambient sensor is protected from direct exposure to the sun.

An example termination block may include an elongated body. The elongated body includes a base panel, two side panels that extend away from each other from opposite edges of the base panel, and an end cap that covers one lateral end of the elongated body. The base panel comprises at least one opening that is configured to securely retain a refrigerant pressure gauge port therein. Further, the end cap comprises a mounting aperture that is configured to receive a fastener therethrough to couple the mounting bracket to the termination block. The mounting bracket may be configured to mount a filter drier to the termination block. The termination block mounts the refrigerant filter drier and the refrigerant pressure gauge port thereto such that copper tubing to and/or from the refrigerant filter drier and the refrigerant pressure gauge port is held in position to assist with brazing the copper tubing to other copper tubing and/or components of the HVAC unit.

Example embodiments of an HVAC unit with the termination block will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The termination block of the present disclosure may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the termination block of the present disclosure can be disposed in an HVAC unit that is located in any type of environment (e.g., warehouse, attic, garage, storage, mechanical room, basement) for any type (e.g., commercial, residential, industrial) of user.

In certain embodiments, the termination block may be configured to position and hold copper refrigerant tubing in place for final brazing in 7.5-12.5 ton HVAC units. However, one of skill in the art can recognize that in other example embodiments, the termination block can be used in any other appropriate HVAC system without departing from a broader scope of the present disclosure. Further, even though the present disclosure describes the termination block as being used in HVAC units, one of skill in the art can understand and appreciate that the termination block can be used with any other appropriate temperature control system that has metal tubing that needs to be held in place for forming the final joint without departing from a broader scope of the present disclosure.

Referring to FIGS. 1-11, an HVAC unit 100 of the present disclosure may include a compressor unit 304, a condenser 207, a filer drier 302, a metering device 602, and an evaporator 204 that are coupled together via refrigerant tubing to form a closed loop. The refrigerant tubing may include a copper discharge line tubing 410 that couples the compressor unit 304 to the condenser 207, a first copper liquid line tubing 316 that couples the condenser 207 to the filter drier 302, a second copper liquid line tubing the couples the filter drier 302 to the metering device 602, and a copper suction line tubing 420 that couples the evaporator 204 to the compressor unit 304.

During the refrigeration cycle, a refrigerant enters the compressor unit 304 as saturated vapor and is compressed to a very high pressure. The temperature of the refrigerant increases during this compression step. The refrigerant leaves the compressor unit 304 as superheated vapor and enters the condenser 207. The condenser 207 comprises a condenser tubes formed into a serpentine-like shape so that a plurality of rows of tubes is formed parallel to each other. Metal fins or other aids are usually attached to the serpentine tubes in order to increase the transfer of heat between the refrigerant passing through the condenser 207 and the ambient air. Heat is rejected from the superheated vapor as it passes through the condenser 207 and the refrigerant exits the condenser as saturated liquid.

The refrigerant in saturated liquid state passes through the filter drier 302 to the metering device 602. The filter drier 302 is configured to prevent contaminants from flowing through the system. The metering device 602 reduces the pressure of the saturated liquid thereby turning it into a saturated liquid-vapor mixture, which is throttled to the evaporator 204. The temperature of the refrigerant drops below the temperature of the ambient air as it goes through the metering device 602. The refrigerant evaporates by absorbing heat from the refrigerated space and leaves the evaporator 204 as saturated vapor at the suction pressure of the compressor unit 304 and reenters the compressor unit 304 thereby completing the cycle.

As illustrated in FIG. 1, a corner post 105 that may conceal, at least partially, a termination block assembly 205 (shown in FIG. 2) of the HVAC unit 100. The corner post 105 may include a service port door 103 having windows 102 through which the refrigerant pressure gauge ports 310 (shown in FIG. 3) of the HVAC unit 100 are visible. The external refrigerant pressure gauge ports 310 of the HVAC unit 100 may be mounted to the termination block assembly 205. That is, the termination block assembly 205 may provide a recessed mounting location for the external refrigerant pressure gauge ports 310. In certain embodiments, the external refrigerant pressure gauge ports 310 may be mounted to the termination block 308 of the termination block assembly 205. The termination block 308 may be described below in greater detail in association with FIG. 12.

Figure 12:
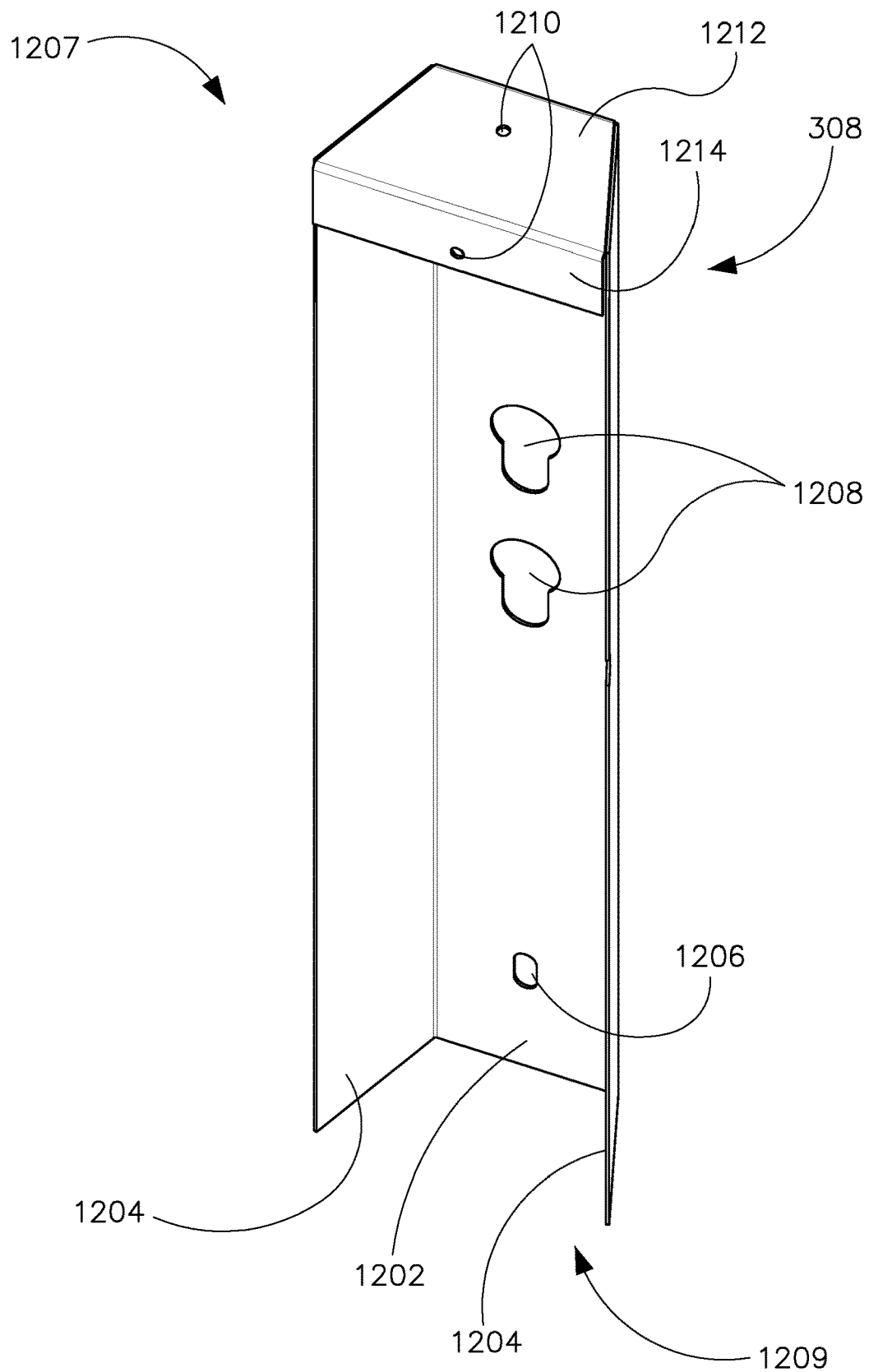
FIG. 12 illustrates a perspective view of the termination block of the HVAC unit, in accordance with example embodiments of the present disclosure.

Referring to FIG. 12, the termination block 308 may have a substantially trapezoid shaped cross-sectional profile. The termination block 308 may include an elongated body that is defined by a base panel 1202 and two side panels 1204 that extend away from each other and from opposite edges of the base panel 1202. In certain embodiments, the side panels 1204 may extend from the opposite edges of the base panel 1202 such that each side panel 1204 defines an obtuse or acute angle with the base panel 1202. However, in other embodiments the side panels 1204 may extend substantially perpendicular to the base panel 1202.

The termination block 308 may also include an end cap 1212 that covers one lateral end 1207 of the elongated body while the opposite lateral end 1209 of the elongated body may be left open. Further, the termination block 308 may include a lip 1214 that is disposed opposite to the base panel 1202 and that extends from an edge of the end cap 1212 towards the opposite lateral end 1209 of the elongated body that is left open.

The base panel 1202 of the termination block 308 may include at least two key hole openings 1208 that are configured to mount and securely hold the external refrigerant pressure gauge ports 310 to the termination block 308. The key hole openings 1208 may allow the external refrigerant pressure gauge port assembly, i.e., the refrigerant valve body and the gauge port tube to be brazed prior to installation. Allowing the external refrigerant pressure gauge port assembly to be brazed prior to installation of the HVAC unit simplifies the final assembly and removes the potential of damaging the termination block 308 with a braze torch. The external refrigerant pressure gauge ports 310 may be securely held in the key hole openings 1208 of the termination block 308 such that the external refrigerant pressure gauge ports 310 and the external refrigerant pressure gauge tubes (320, 322) are protected from damage during shipment of the HVAC unit 100. The external refrigerant pressure gauge ports 310 may be received through the wider portion of key hole openings 1208 and securely held and retained within the narrow portion of the key hole openings 1208.

In addition to the key hole openings 1208, the base panel 1202 of the termination block 308 may include a coupling aperture 1206 that is configured to receive a fastener, such as a screw therethrough to couple the termination block 308 to the compressor mounting platform 306 on which the compressor unit 304 is disposed as illustrated in FIGS. 3-11.

Further, the end cap 1212 and the lip 1214 of the termination block 308 may include apertures 1210 formed therein. The aperture 1210 formed in the lip 1214 may be configured to receive a fastener therethrough to couple the termination block 308 to the corner post 105 for additional stability. The termination block 308 may be coupled to the corner post 105 after the final braze process of the refrigerant copper tubes is completed. The aperture 1210 formed in the end cap 1212 may be configured to receive a fastener 702 (shown in FIG. 7) therethrough to attach a mounting bracket 312 to the termination block 308. The mounting bracket 312 may be configured to strap and mount a refrigerant filter drier 302 of the HVAC unit 100 to the back surface (surface opposite to the one facing the external panel 105) of the base panel 1202 of the termination block 308 and at a distance above the compressor mounting platform 306 of the HVAC unit 100 (offset from the ground) as illustrated in FIGS. 3-11.

In certain embodiments, the termination block 308 may be configured to support and mount the external refrigerant gauge ports 310 and the refrigerant filter drier 302 thereto such that copper tubing (316, 318, 320, 322) to and from the refrigerant filter drier 302 and the external refrigerant gauge ports 310 may be supported and positioned for a final braze process with: (a) other copper tubing of the HVAC system 100, such as the liquid line tubing 318, suction line tubing 420, discharge line tubing 410, etc., and/or (b) other components of the HVAC system 100, such as the condenser 207, the metering device 602, etc.

For example, once the refrigerant filter drier 302 is mounted to the termination block 308, the input end 919 (shown in FIG. 9) of a first copper liquid line tubing 316 from the refrigerant filter drier 302 may be positioned adjacent to and aligned with an output end of a copper tubing from the condenser 207. The first copper liquid line tubing 316 may be configured to couple an output of a condenser 207 to the input of the filter drier 302. Similarly, the output end 515 of a second copper liquid line tubing 318 from the output of the refrigerant filter drier 302 that is mounted to the termination block 308 may be positioned adjacent to and aligned with the input end of a copper tubing to the metering device 602. The second copper liquid line tubing 318 may be configured to couple the output of the filter drier 302 and an input of the metering device 602.

In said example, the output end 815 of the low pressure refrigerant gauge copper tubing 320 from the refrigerant low pressure gauge port 310 that is mounted to the termination block 308 may be positioned adjacent to and aligned with an opening in the suction line 420 that extends from the evaporator 204 to the compressor unit 304. Furthermore, in said example, the output end 917 of the refrigerant high pressure gauge copper tubing 322 from the refrigerant high pressure gauge port 310 that is mounted to the termination block 308 may be positioned adjacent to and aligned with an opening in the first copper liquid line tubing 316 that extends from the condenser 207 to the input of the refrigerant filter drier 302.

In said example, the termination block 308 may aid in holding the positions of the copper tubing (316, 318, 320, and 322) as described above for a final braze process that would couple: the first copper liquid line tubing 316 from the input of the refrigerant filter drier 302 to the output of the condenser 207, the second copper liquid line tubing 318 from the output of the refrigerant filter drier 302 to another copper tubing connecting to the input of the metering device 602, the copper tubing 320 from the refrigerant low pressure gauge port 310 to the suction line 420, and the copper tubing 322 from the refrigerant high pressure gauge port 310 to the first copper liquid line tubing 316. In other words, the termination block 308 may hold the copper tubing to and from various components of the HVAC unit 100 in position for a final braze process without having to find other support structures or without the need to have someone hold the copper tubing in place manually.

The above referenced copper tubes are only examples, and in other example embodiments, the termination block 308 may be configured to position any other refrigerant carrying metal tubes in position for connecting said refrigerant carrying metal tubes to any other appropriate metal tubes or components of the HVAC system 100 without departing from a broader scope of the present disclosure. Further, even though the present disclosure describes that the termination block is positioned or mounted to the compressor mounting platform 306, one of skill in the art can understand and appreciate that in other example embodiments, the termination block may be disposed on or mounted to any other portion of the HVAC unit 100 that still allows the copper tubes to be positioned and aligned appropriately and as desired without departing from a broader scope of the present disclosure. Furthermore, in other example embodiments, the refrigerant filter drier 302 may be mounted to any other portion of the termination block 308 without departing from a broader scope of the present disclosure.

Additionally, in some example embodiments, the termination block 308 may include an air sensor opening (not illustrated) that is formed in the base panel 1202 (or other portions of the termination block such as 1204 or 1212) to receive an ambient air sensor probe (not illustrated) therethrough. For example, the air sensor opening may be formed above the key hole openings 1208. A fan may draw ambient air through the windows 102 in the cabinet door 103 of the corner post 105 and the air sensor opening in the base panel 1202 of the termination block. The ambient air sensor may be configured to sense the ambient air temperature and/or pressure from the air that is drawn in through the windows 102 and the air sensor opening by the fan. Instead of disposing the ambient air sensor external to the HVAC unit 100, positioning the ambient air sensor within the termination block 308 that is at least partially concealed by the corner post 105 as described herein may shelter the ambient air sensor from direct exposure to the sun which in turn may result in longer operation life of the ambient air sensor and create a more accurate reading of outdoor temperature.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A termination block assembly of an HVAC unit, the termination block assembly comprising:
    a termination block defined by an elongated body comprising:
        a hole formed therein that is configured to install and securely retain a refrigerant pressure gauge port therein, and
        a coupling aperture that is configured to couple the termination block to a frame of the HVAC unit; and
    a mounting bracket that is coupled to the termination block and configured to mount a refrigerant filter drier to the termination block,
    wherein the termination block is configured to mount the refrigerant filter drier and the refrigerant pressure gauge port thereto such that copper tubing coupled to the refrigerant filter drier and the refrigerant pressure gauge port is held in position to assist with brazing the copper tubing to one or more of other copper tubing and another component of the HVAC unit.

2. The termination block assembly of claim 1, wherein the termination block has a substantially trapezoid shaped cross-sectional profile.

3. The termination block assembly of claim 1, wherein the hole has a wide portion that is configured to receive the refrigerant pressure gauge port and a narrow portion that is configured to securely hold and retain the refrigerant pressure gauge port.

4. The termination block assembly of claim 1, wherein the termination block comprises:
    a base panel comprising the hole;
    two side panels that extend away from each other at an angle from opposite edges of the base panel; and
    an end cap that covers one lateral end of the elongated body and comprises a mounting aperture that is configured to receive a fastener therethrough to couple the mounting bracket to the termination block.

5. The termination block assembly of claim 1, wherein the mounting bracket is configured to mount the refrigerant filter drier to the termination block such that the refrigerant filter drier is disposed at a back surface of the base panel, the back surface facing away from a service port door.

6. The termination block assembly of claim 1, wherein the frame of the HVAC unit to which the termination block is coupled is a compressor mounting platform on which a compressor is mounted.

7. The termination block assembly of claim 4, wherein the base panel of the termination block further comprises a sensor opening that is configured to receive a probe of an ambient air sensor therethrough to couple the ambient air sensor to the termination block such that the ambient air sensor is shielded from direct exposure to the sun.

8. The termination block assembly of claim 1, wherein the termination block is disposed in the HVAC unit such that the termination block is at least partially concealed by a corner post of the HVAC unit and an ambient air sensor that is coupled to the termination block is sheltered from direct exposure to the sun.

9. The termination block of claim 8, wherein the corner post comprises a service port door having windows through which the refrigerant pressure gauge port is visible.

10. The termination block of claim 1, wherein the elongated body comprises another hole that is formed therein, the other hole being configured to securely retain another refrigerant pressure gauge port therein.

11. The termination block of claim 10, wherein the refrigerant pressure gauge port is a refrigerant high pressure gauge port and the other refrigerant pressure gauge port is a refrigerant low pressure gauge port.

12. The termination block of claim 10, wherein the refrigerant pressure gauge port is a refrigerant low pressure gauge port and the other refrigerant pressure gauge port is a refrigerant high pressure gauge port.

13. An HVAC unit comprising:
    a refrigerant pressure gauge port; and
    a termination block that is coupled to a frame of the HVAC unit,
    wherein the termination block is configured to securely couple the refrigerant pressure gauge port thereto such that a first set of copper tubing coupled to the refrigerant pressure gauge port is held in position to assist with brazing the first set of copper tubing to one or more of other copper tubing or another component of the HVAC unit;
    wherein the termination block is disposed in the HVAC unit such that the termination block is at least partially concealed by a corner post of the HVAC unit and an ambient air sensor that is coupled to the termination block is sheltered from direct exposure to the sun.

14. The HVAC unit of claim 13, wherein the termination block is configured to mount a filter drier thereto such that a second set of copper tubing coupled to the filter drier is held in position to assist with brazing the second set of copper tubing to one or more of the other copper tubing and the other component of the HVAC unit.

15. The HVAC unit of claim 13, wherein the termination block comprises a key hole opening that is configured to securely retain the refrigerant pressure gauge port, wherein a wider portion of the key hole opening is configured to receive the refrigerant pressure gauge port and a narrow portion of the key hole opening is configured to hold and securely retain the refrigerant pressure gauge port.

16. The HVAC unit of claim 13, wherein the termination block comprises:
    a base panel comprising a hole that is configured to receive and securely retain the refrigerant pressure gauge port therein;
    two side panels that extend away from each other from opposite edges of the base panel; and an end cap that covers one lateral end of the elongated body and comprising a mounting aperture that is configured to receive a fastener therethrough to couple a mounting bracket to the termination block.

17. The HVAC unit of claim 16, wherein the mounting bracket is configured to mount the refrigerant filter drier to the termination block such that the refrigerant filter drier is disposed at a back surface of the base panel.

18. The HVAC unit of claim 13, wherein the frame of the HVAC unit to which the termination block is coupled is a compressor mounting platform on which a compressor of the HVAC unit is mounted.

19. The HVAC unit of claim 16, wherein a base panel of the termination block further comprises a sensor opening that is configured to receive a probe of an ambient air sensor therethrough to couple the ambient air sensor to the termination block such that the ambient air sensor is shielded from direct exposure to the sun.

\* \* \* \* \*